United States Patent [19]

Horst et al.

[11] 4,385,285

[45] May 24, 1983

[54] CHECK DISPENSING TERMINAL

[75] Inventors: William R. Horst; William J. Hale, both of Dayton, Ohio

[73] Assignee: NCR Corporation, Dayton, Ohio

[21] Appl. No.: 250,370

[22] Filed: Apr. 2, 1981

[51] Int. Cl.³ .............................................. G06K 9/00
[52] U.S. Cl. ............................... 382/3; 235/58 CW; 235/379; 340/825.34; 382/7
[58] Field of Search ............... 235/58 CW, 379–381; 340/825.3, 825.31, 825.32, 825.33, 825.34, 825.35, 146.3 SY; 101/DIG. 18; 194/4 R, 4 C, 4 F, 4 G

[56] References Cited

U.S. PATENT DOCUMENTS

| | | | |
|---|---|---|---|
| 3,570,756 | 3/1971 | Grey | 235/58 |
| 3,621,720 | 11/1971 | Clark | 340/146.3 SY |
| 3,624,357 | 11/1971 | Wright | 235/381 |
| 3,648,020 | 3/1972 | Tateisi et al. | 340/825.33 |
| 3,677,463 | 7/1972 | Grey | 235/58 CW |
| 3,802,724 | 4/1974 | Gosnell | 283/9 |
| 3,852,571 | 12/1974 | Hall et al. | 340/825.34 |
| 3,959,773 | 5/1976 | Hyman | 340/172.5 |
| 3,970,992 | 7/1976 | Boothroyd et al. | 364/900 |
| 4,134,537 | 1/1979 | Glaser et al. | 235/379 |
| 4,143,357 | 3/1979 | Baver et al. | 340/146.3 SY |
| 4,179,139 | 12/1979 | Savar et al. | 282/23 R |
| 4,208,575 | 6/1980 | Haltof | 235/380 |
| 4,234,868 | 11/1980 | Radice | 340/146.3 SY |
| 4,234,932 | 11/1980 | Gorgens | 364/900 |
| 4,236,068 | 11/1980 | Walton | 235/380 |
| 4,281,313 | 7/1981 | Boldridge | 340/146.3 SY |
| 4,317,028 | 2/1982 | Simjian | 235/379 |
| 4,321,672 | 3/1982 | Braun et al. | 235/379 |

Primary Examiner—Leo H. Boudreau
Attorney, Agent, or Firm—J. T. Cavender; Albert L. Sessler, Jr.; Elmer Wargo

[57] ABSTRACT

A method and apparatus for issuing negotiable instruments such as checks from a terminal comprising: first means (identification card reader) for identifying an account number against which a monetary amount of a check to be issued by the terminal is to be charged; second means (handwriting transducer) for inputting into the terminal identification data which will be used in determining whether to accept or reject a user of the terminal as authorized to issue a check against the account number; third means (bank data system) for supplying authorized identification data to the terminal and also for supplying evaluation criteria, such as a current monetary balance, for the account number; entry means (keyboard) for entering check data including the monetary amount; means for comparing (processor) the identification data with the authorized identification data and for generating an accept signal or a reject signal as a result of the comparing; the comparing means also comparing the monetary amount with the evaluation criteria and for generating an issue signal when the associated comparison is favorable; means for transporting (paper strip drive) a record medium to a print station in the terminal; and a printer for printing the account number and the monetary amount on the record medium at the print station in response to the accept signal and the issue signal, whereby the record medium becomes the check which is issued from the terminal.

18 Claims, 14 Drawing Figures

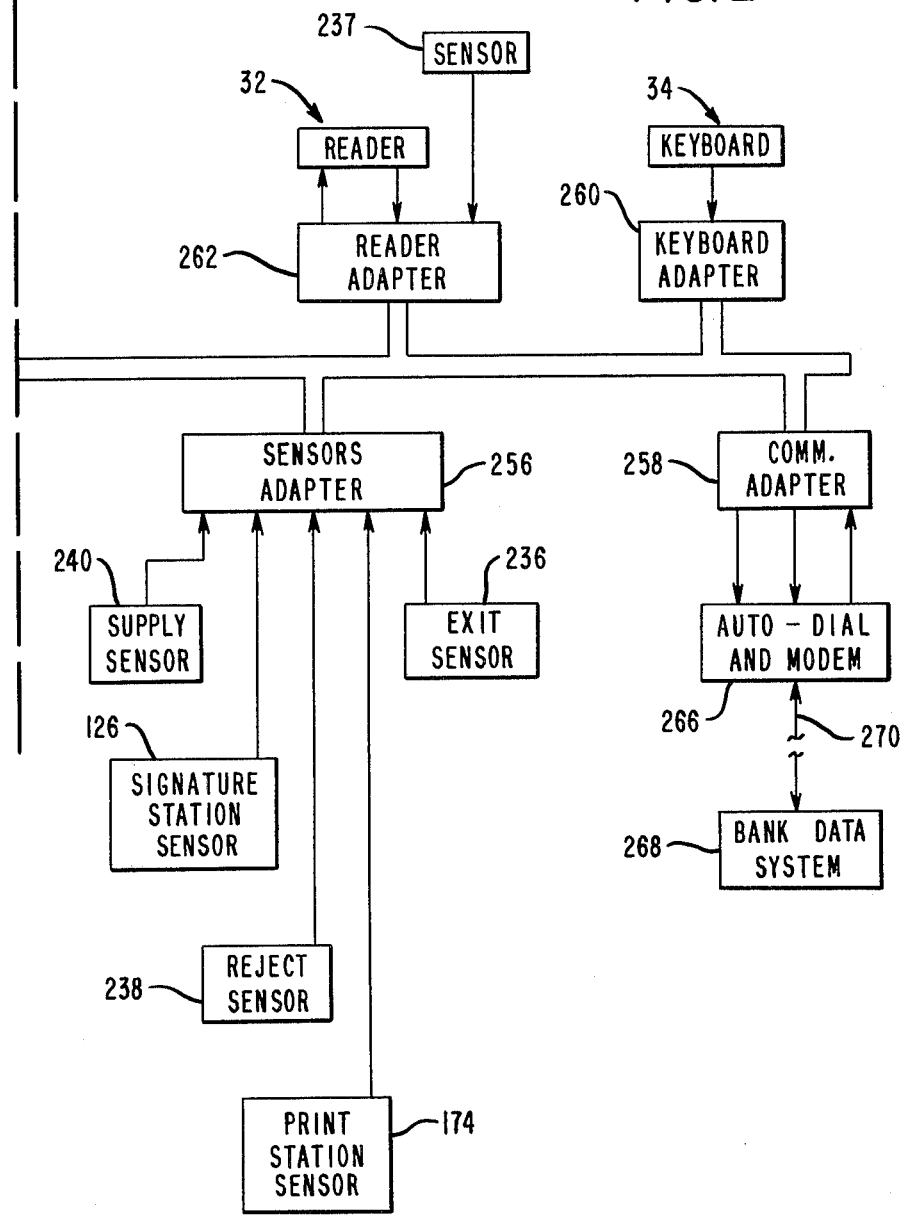

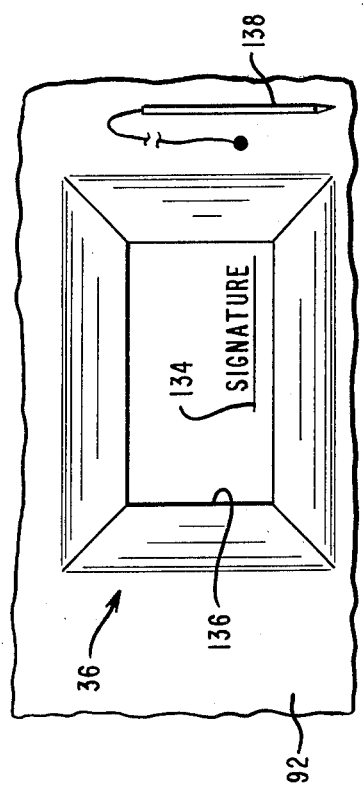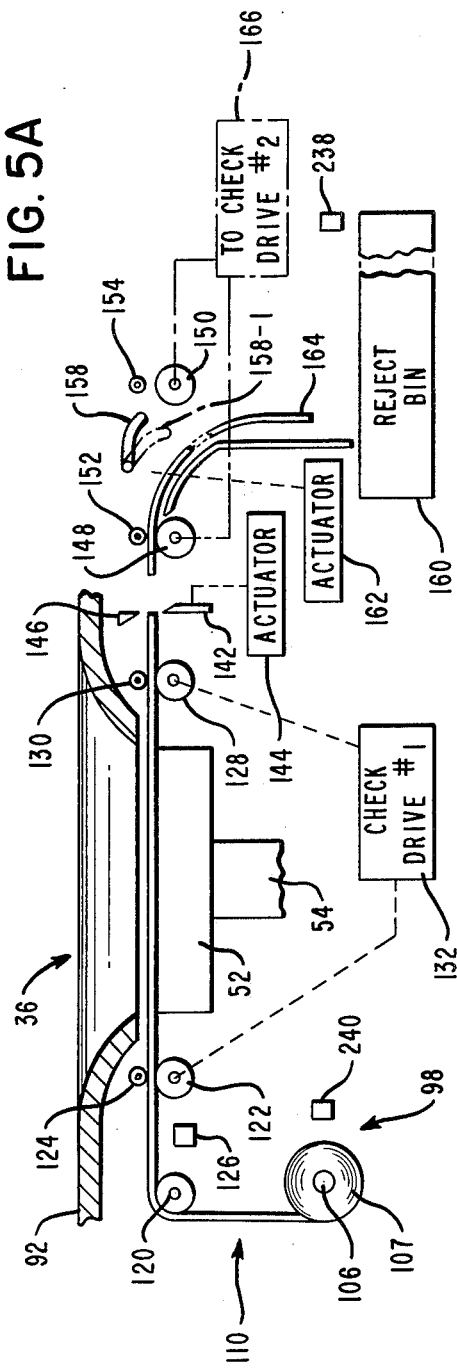

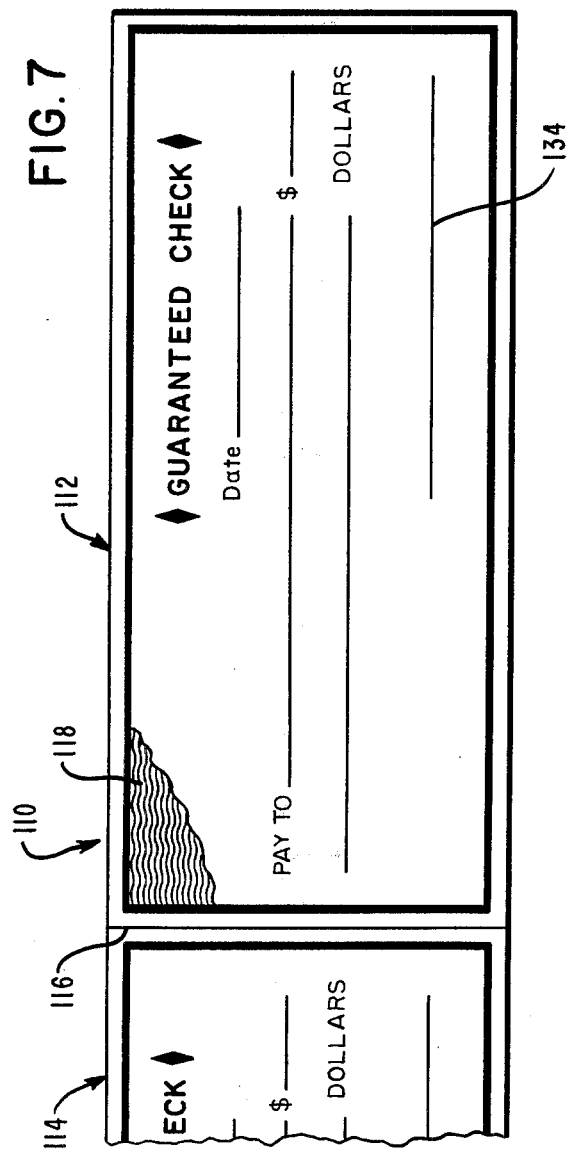
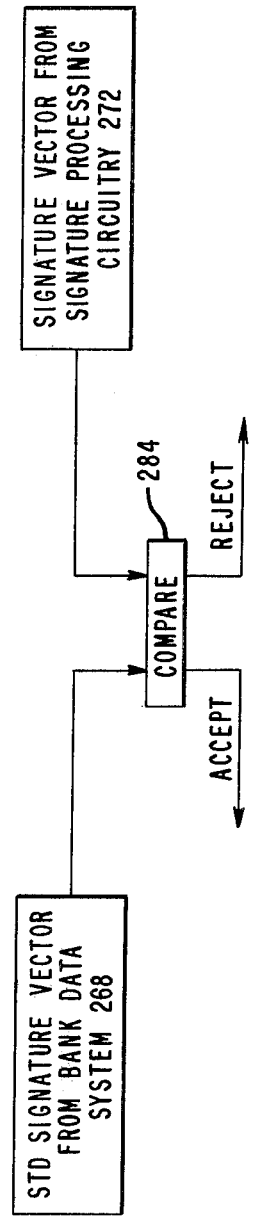

CHECK DISPENSING TERMINAL

BACKGROUND OF THE INVENTION

This invention generally relates to a self-service financial terminal, and more particularly, it relates to such a terminal which provides its customers with bank-guaranteed, negotiable instruments such as checks which are accepted by merchants without delay or question.

Statistics indicate that banks currently process more than 30 billions of checks per year. It is estimated that over 4 billions of these checks are written by individuals for food, retail goods, and gasoline. Most of these checks are written at the point of sale and necessitate that the affected merchant make an on-the-spot decision to accept or reject the check being offered in order to complete the transaction. The imperfection of these decisions is demonstrated by the fact that recent bad-check losses for retail stores are well over a billion dollars per year.

Some of the attempts to reduce these bad-check losses include, for example, requesting multiple identifications, fingerprints, photographs, and also requesting management approval of the checks prior to accepting them. These attempts further result in customer dissatisfaction due to inconvenience, delays, and embarrassment.

Another common approach to reducing bad-check losses relates to using a list or file of persons from whom checks will no longer be accepted. This approach is often implemented as a printed list or is implemented through electronic inquiry of a list at a central file. Even if a person's name is not on such a list, the present balance in his checking account may not be adequate to cover a check he intends to offer a merchant, but this fact is not known to the merchant under this approach.

A somewhat more sophisticated version of a list at a central file (previously described) relates to the use of a small dedicated terminal which is operatively coupled to a bank office in an on-line or real-time environment. An individual's "credit card" or "debit card", for example is entered into the terminal to obtain the checking account number, a Personal Identification Number (hereinafter referred to as PIN) is also entered into the terminal, and the amount of the check to be presented is also entered therein. Approval or disapproval of the check for the amount of the check is then printed on the back of the check. While this approach is more effective towards reducing bad-check losses than the manual methods previously discussed, it is still vulnerable to falsification and forgery. For example, one survey indicated that well over 50% of card holders wrote their PIN's on their respective cards so as to not forget the PIN's; consequently, the security of a PIN-based system is susceptible to falsification and forgery. Also, the form of the printed characters on the back of a check which indicate "approval" are typically simple matrix font characters which are easily forged.

SUMMARY OF THE INVENTION

This invention relates to a method and apparatus for dispensing negotiable instruments such as checks from a self-service terminal.

The apparatus or check issuing terminal, in a preferred embodiment of this invention, comprises: first means for identifying an account number against which a monetary amount of a check to be issued by the terminal is to be charged; second means for inputting into the terminal identification data which will be used in determining whether to accept or reject a user of the terminal as authorized to issue a check against the account number; third means for supplying authorized identification data to the terminal and also for supplying evaluation criteria such as a current monetary balance for the account number; entry means for entering check data including the monetary amount; means for comparing the identification data with the authorized identification data and for generating an accept signal or a reject signal as a result of the comparing. The comparing means also compares the monetary amount with the evaluation criteria such as the current monetary balance and generates an issue signal when the associated comparison is favorable. The apparatus also includes means for transporting a record medium to a print station in the terminal; and means for printing at least the account number and the monetary amount on the record medium at the print station in response to the accept signal and the issue signal, whereby the record medium becomes the check which is issued from the terminal.

In a preferred embodiment of the method of this invention, the method of further verifying the identity of the user of the check issuing terminal in addition to using an identification card is to use the user's act of writing his signature on a check form. The check form with the user's signature thereon eventually becomes the check which is issued from the terminal.

BRIEF DESCRIPTION OF THE DRAWING

FIGS. 2A and 2B taken together show a schematic diagram in block form of the various components included in the terminal shown in FIG. 1;

FIGS. 5A and 5B taken together are diagrammatic views taken from the direction A in FIG. 1 to show details of the means for transporting a check to the write station shown in FIG. 1 and also to show the means for printing data on a check having an authorized signature thereon;

FIG. 6A is a plan view, looking down at the signature station shown in FIG. 1;

FIG. 7 is a plan view of the check forms which are fed, in the nature of a continuous form, to the signature station;

FIG. 11 is a flow chart showing the comparison process for accepting as valid or rejecting as invalid a user's signature.

DETAILED DESCRIPTION OF THE INVENTION

Before proceeding with a detailed description of this invention, it appears appropriate to discuss, generally, how it is used.

Figure 1:
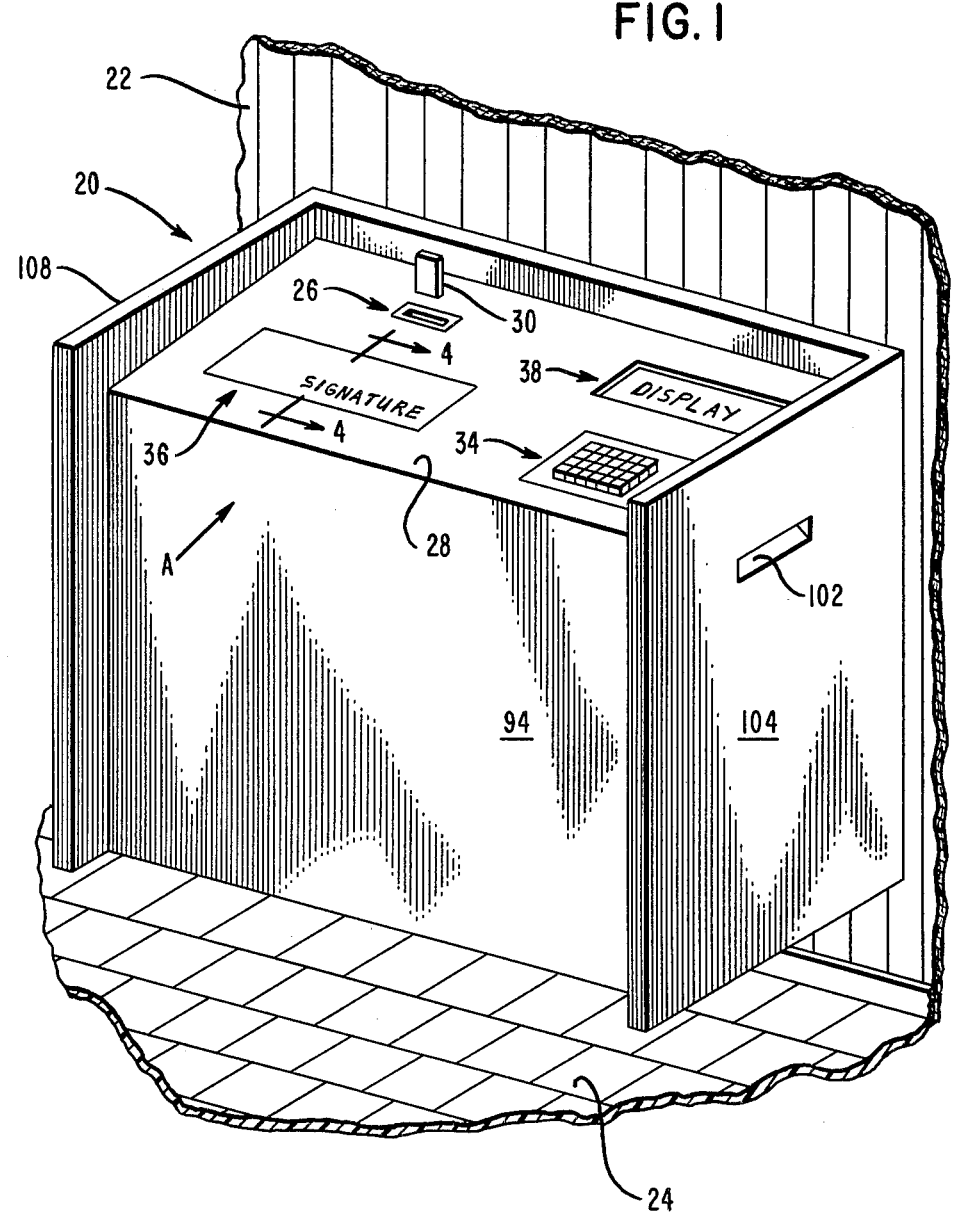
FIG. 1 is a general perspective view of a preferred embodiment of this invention which shows a check issuing terminal including a keyboard, card reader, a display for displaying amounts and lead-through or user instructions, and a signature writing station.

FIG. 1 shows a perspective view of one embodiment of this invention which is portrayed as a negotiable instrument or check dispensing terminal which is designated generally as 20. The terminal 20 may be of the freestanding variety, for example, or it may be secured to a wall 22 at a convenient height above a floor 24 so as to facilitate the use of the terminal 20. The terminal 20 may be located in business establishments such as retail stores and grocery stores, for example, where the customers frequently present checks in payment for goods or services received. In general, it is preferable to locate the terminal 20 (or terminals if required) in these business establishments at a location away from the cash registers or payment areas so as to facilitate the flow of customers making payment thereat.

If a customer of a business establishment wants to make payment with a check issued by the terminal 20, the following general procedure is used. The terminal 20 is provided with a station 26 (located in panel 28) for use with an identification card 30 which may be, for example, similar to that employed with automated teller or cash dispensing machines. The card 30 is inserted into a slot at station 26 to be withdrawn into the terminal 20 and read by a conventional card reader 32 (FIG. 2B) or the card may be read by simply manually moving the card (properly oriented) to place the data thereon in reading relationship with the reader 32. The data on the card 30 may include the account number of the owner of the card and the particular bank at which the account resides if the terminal is used in a multibank environment. Reading the card 30 activates the terminal 20, although it may be activated by entering an account number on the associated keyboard 34. For the moment, activation of the terminal 20 signifies, for example, that the terminal is coupled with its host bank computer system via a communication line, that the account number entered is verified, and that personal data associated with the entered account number is transferred from the bank computer system to the terminal 20.

Because a thief or a user having unlawful possession of the card 30 also may attempt to actuate a typical terminal, it is generally advisable to require some additional information from the user to establish his identity or right to use the terminal 20. As previously stated, this additional information may be obtained by entering a memorized secret number on the keyboard 34. A palm print or fingerprint may be required as an alternative, however, in the preferred embodiment described herein, the additional information required is obtained from the user's act of signing his signature which is entered into the terminal 20 at station 36. The terminal 20 makes accessible the signature line portion of a check form or a blank check at station 36 (by means to be later described hereinafter) and the display 38 requests the user to sign his name on the blank check at the station 36.

As the user writes his signature on a blank check at station 36 (FIG. 1), the process of writing his name generates an analog waveform which is peculiar or unique to him. The terminal 20 employs signature verification techniques to analyze the analog waveform to confirm or deny that the signature entered at station 36 corresponds to the official signature associated with the account number entered. At this point in time, it is important to note that the signature which is entered at station 36 and used for account verification is the same signature that will appear ultimately on the check which is issued by the terminal 20. This feature enhances the acceptance by merchants of checks issued by the terminal 20.

Assuming that the signature entered at station 36 (FIG. 1) is a valid signature for the associated account, the terminal 20 will instruct the user thereof (via the display 38) to enter upon the keyboard 34 the monetary amount of the check to be issued. The monetary amount requested is then compared with evaluation criteria such as the financial or monetary balance remaining in the affected account, the number of times the affected account has been used in a day, how the requested monetary amount compares with any monetary limits per check which the associated bank may have established, and the like, and a decision is made to approve or disapprove the requested withdrawal. However, in order to simplify the discussion, the "evaluation criteria" will be referred to hereinafter as simply "a sufficient monetary balance".

Assuming that the user has a sufficient monetary balance in his checking account to permit the withdrawal of the requested amount, the display 38 will instruct the user to enter a Payee Code Number (hereinafter referred to as PCN) on the keyboard 34. The PCN's for the various major merchants in the area are then displayed on the display 38 (or they may simply appear on a printed list which is available at the terminal). The PCN is used by the terminal 20 to print the payee's name on the check.

After the PCN is entered on the keyboard 34, the blank check with the approved signature thereon is moved to a print station within the terminal 20 where a printing means designated generally as 100 (FIG. 2A) prints the pertinent data on the check.

Figure 3:
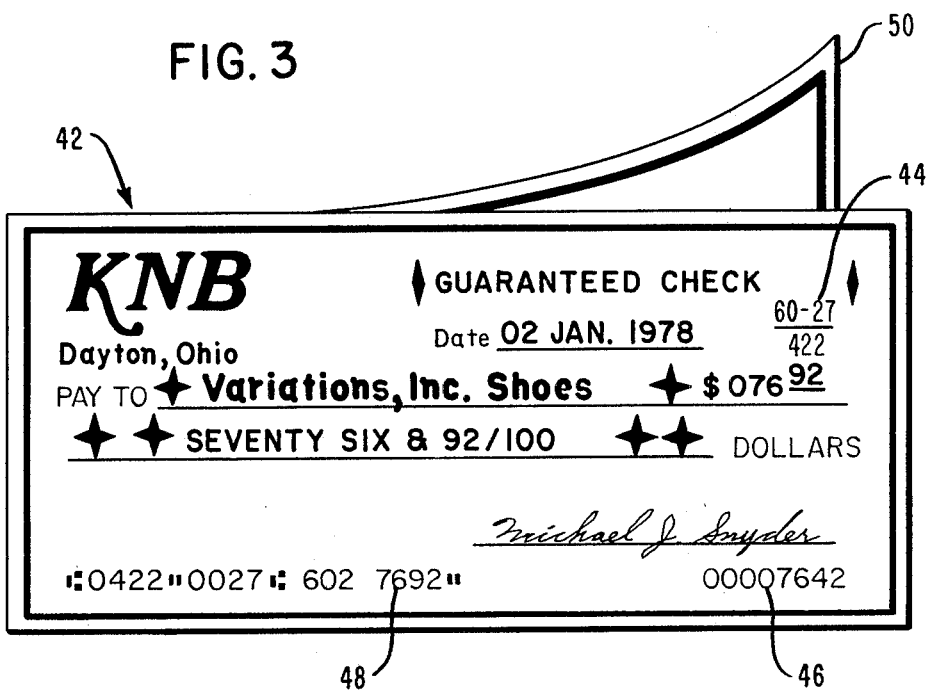
FIG. 3 is a plan view of one embodiment of a check and its "tissue" or carbon copy as they are issued from the terminal shown in FIG. 1.

FIG. 3 shows one embodiment of a completed check 42 as it is issued by the terminal 20. The printing means 100 prints the date of the check, the monetary amount in both word and numerical forms, the bank logo or name, the bank number shown by reference numeral 44, a conventional MICR encoded monetary amount shown by reference numeral 46, and a conventional MICR encoded account number and bank information data which are shown by reference numeral 48. The terminal 20 may also supply a "tissue copy" 50 of the check 42 for the user to keep for his records. The check 42 may have the notation "Guaranteed Check" thereon to distinguish it from a simple personal check which requires the time-consuming checking procedures mentioned earlier. With the guaranteed check 42, the user then presents it to the merchant who reviews it for payee, date, amount and accepts it without requiring additional information.

Naturally, less than all the printing done by the printing means 100, as described, may be effected to suit particular applications.

Some of the features of this invention which will be described in more detail hereinafter, are as follows.

1. A uniquely printed check is provided.
2. The check dispensed by the terminal 20 is not alterable without detection, nor is it available elsewhere.

3. The critical portions; such as monetary amount, account number, etc. are fully printed in MICR (Magnetic Ink Character Recognition) style or printing.

4. Personal verification other than by signature analysis is possible, e.g. PIN.

5. The check 42 is fully printed and signed by the user of the terminal 20 before issuance thereby.

6. The checks like 42 are traceable to entries made on a journal within the terminal 20 when the journal is provided as an option. The journal may take the form of a printed notation or an electronic recording on an appropriate medium such as a magnetic tape.

7. A numeric keyboard is available for the entry of the monetary amount on a check and the entry of the Payee of the check.

8. The user's account number and associated bank are entered via a plastic identification card (like a credit card), or they may be entered via the keyboard 34.

9. Real time communication to a host bank's computer system provides up-to-date account information such as account balances.

10. The display 38 is used for displaying data entered and also for providing lead-through instructions.

Having discussed the general functioning of the terminal 20 and its principal advantages, it appears appropriate to discuss, in detail, some of the individual elements thereof.

Figure 8:
FIG. 8 is a sample waveform which is generated by the transducer shown in FIG. 4.
Figure 4:
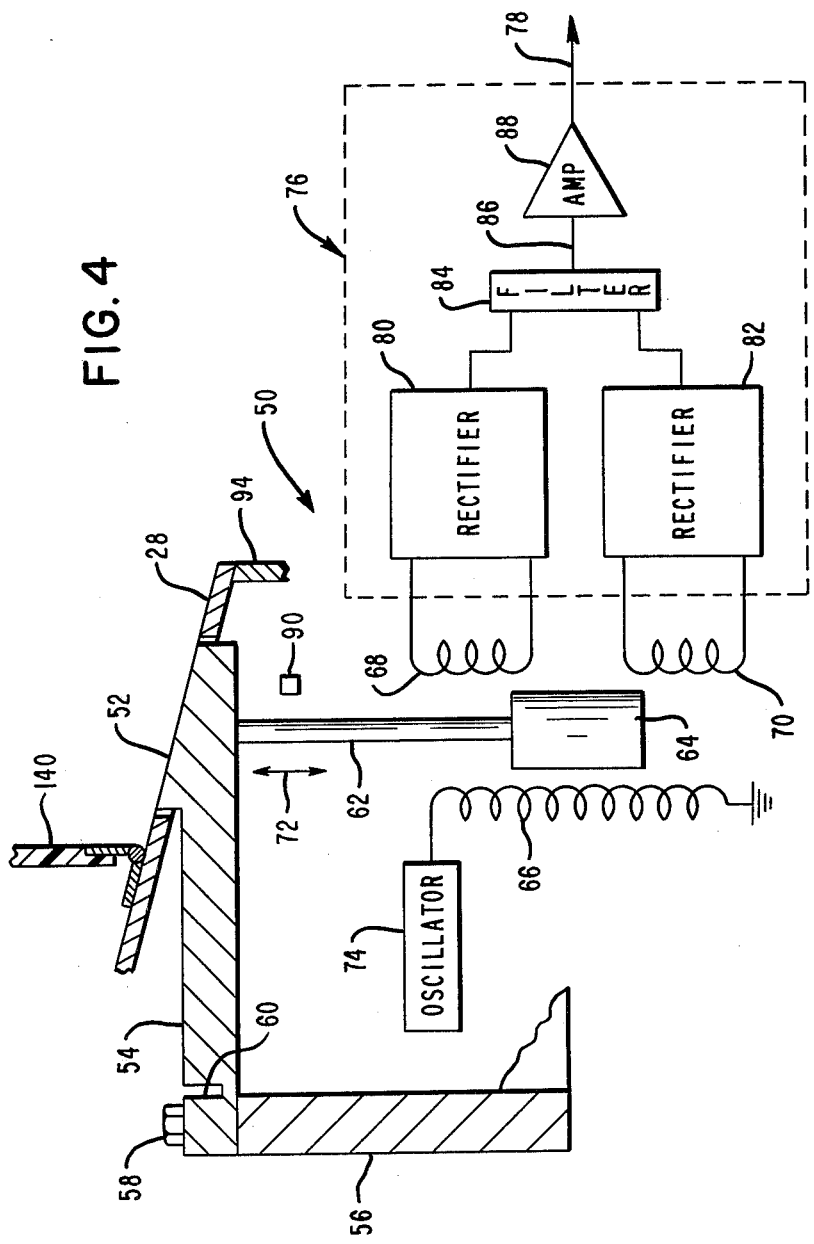
FIG. 4 is a side view, in diagrammatic form, of a transducer whose writing table is located at the writing station shown in FIG. 1, with the view taken along the general line of 4—4 in FIG. 1.

FIG. 4 is a side view, in diagrammatic form, of a transducer 50 which has its writing table 52 positioned at station 36 in FIG. 1 so as to enable a user of the terminal 20 to write his signature on a check form or blank check when the check is positioned on the writing table 52. The transducer 50 may be any conventional transducer which transforms the various pressure variations which are generated as an individual writes on the writing table 52 into an analog signal or waveform. In one embodiment, the table 52 is supported on one end of a cantilever 54 whose remaining end is secured to a stationary frame member 56 by a fastener 58. The cantilever 54 has a reduced area 60 which enables the table 52 to be deflected resiliently downwardly (as viewed in FIG. 4) under the pressure of writing and to return to the position shown when the pressure is removed. A rod 62 has one end thereof secured to the underside of cantilever 54 and the remaining end thereof has a core member 64 thereon which is positioned between coils 66, 68 and 70 in magnetic, flux-coupling relationship therewith. When an individual writes upon a check positioned on table 52, the core member 64 moves in the directions of arrows 72 in response to the writer's individual writing characteristics. A conventional oscillator 74 provides the excitation voltage to the coil 66 (which is the primary) at a frequency of 20 Khz. in the embodiment described. The coils 68 and 70 are coupled to a conventional circuit 76 (shown in dashed outline) which produces an analog output signal on conductor 78, which signal varies in accordance with the individual's own peculiar writing characteristics so as to provide an identification of the individual using the terminal 20. The coil 68 is connected to a rectifier 80 and the coil 70 is similarly connected to a rectifier 82. When the core member 64 is in the neutral or null position shown in FIG. 4, the voltages induced in the coils 68 and 70 will be identical and 180 degrees out of phase with each other so that there is no net output from the circuit 76. When the core member 64 is displaced from its null position, one of the coils 68 or 70 will have a higher voltage induced therein than the other. The voltages induced in coils 68 and 70 are rectified in rectifier circuits 80 and 82, respectively. The outputs of rectifier circuits 80 and 82 are fed into a filter circuit 84 which filters out the high-frequency ripple therein. The filter circuit 84 also includes a potentiometer circuit (not shown) with one terminal thereof receiving the filtered output from rectifier 80 and the other terminal of the potentiometer circuit similarly receiving the filtered output from the rectifier 82. The output of the filter circuit 84 which comes from the sliding contact of the potentiometer circuit mentioned appears on conductor 86 which is fed into the positive input of a conventional operational amplifier 88. The voltages induced in the coils 68 and 70 represent, essentially, a linear function of the displacement of the core member 64 responding to movements of the writing surface 52. Because there is no mechanical friction between the core member 64 and the coils 66, 68, and 70, and because the mass of the core member 64 is very small, the transducer 50 accurately generates electrical signals representative of the incrementally small motion generated at the writing table 52 during the process of writing. The cantilever 54 may be made of a tough metal so that it can withstand a large range of bending moments which may be developed during writing on writing table 52. A stop 90 may be placed under the writing table 52 so as to limit the downward movement of the table 52 as viewed in FIG. 4. A portion of the top counter or panel 28 and the front panel 94 of the terminal 20 are shown in FIG. 4 simply to show the location of the writing table in the terminal 20. One waveform 96, as generated by an individual writing his signature on table 52 and as received on output conductor 78 coming from the circuit 76, is shown in FIG. 8. The waveform 96 will be discussed in more detail hereinafter.

Another group of elements to be described in detail relates to the means for transporting (designated generally as 98 in FIG. 5A) a blank check to the station 36 in FIG. 1 and the printing means 100 for printing data on the check which has an authorized signature thereon.

Figure 5B:
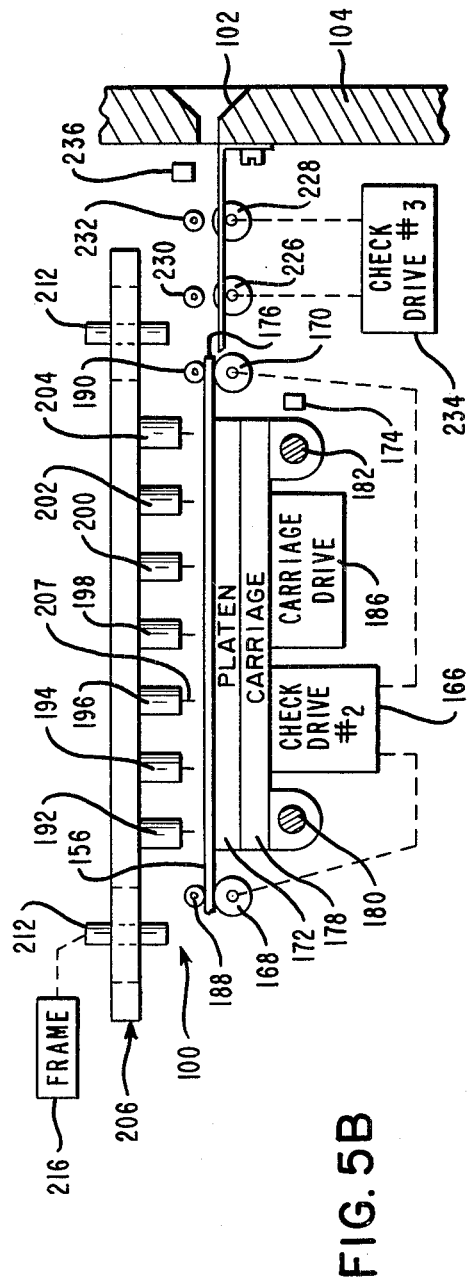

The check transport means 98 is shown in diagrammatic form in FIGS. 5A and 5B and is viewed from the direction of arrow A in FIG. 1. The check transport means 98 may comprise any conventional means to move a check to the station 36, to the printing means 100 (FIG. 5B) and to move a completed check like 42 out of the terminal 20 via slot 102 in the side panel 104 of the terminal 20. Naturally, the particular check transport means 98 selected is dependent upon the type of check to be issued from the terminal 20.

In the embodiment described, the check transport means 98 includes a fixed rod 106 upon which a supply roll 107 (FIG. 5A) of check forms is mounted. The side panels 108 and 104 and the front panel 94 (FIG. 1) of the terminal 20 have suitable key-locked, access panels (not shown) therein to enable the terminal to be supplied with check forms and to be serviced.

A portion or strip 110 of the check forms used in the terminal 20 is shown in FIG. 7. The strip 110 is comprised of pre-printed forms which form separate checks like 112 and 114 when severed along a cut line 116. Naturally, the amount of data which is preprinted on a check like 112 is dependent upon a particular application. The check 112 does not have a particular bank logo pre-printed thereon in order to enable the check to be used with several banks which share the check dispensing facilities provided by the terminal 20. If only a single bank, for example, utilizes the terminal 20, then, that bank's logo and associated MICR encoded data may be pre-printed on strip 110. Each individual check like 112 of the strip 110 may have a selected "security pattern", such as wavy scored lines thereon, as shown in the corner 118 of check 112 to provide a "distinctive look" to the guaranteed check issued from the terminal 20 and to make erasures on the check more apparent. The checks like 112 may have the term, "Guaranteed Check", printed thereon so as to further distinguish them from conventional personal checks. Also, each check like 112 may have preprinted sequential numbers or common supply roll numbers printed thereon in order to allow a specific number or range of numbers to be categorized as non-acceptable when presented to the merchant in case the numbered check form or supply roll is known to have been obtained by illegal means.

Figure 6B:
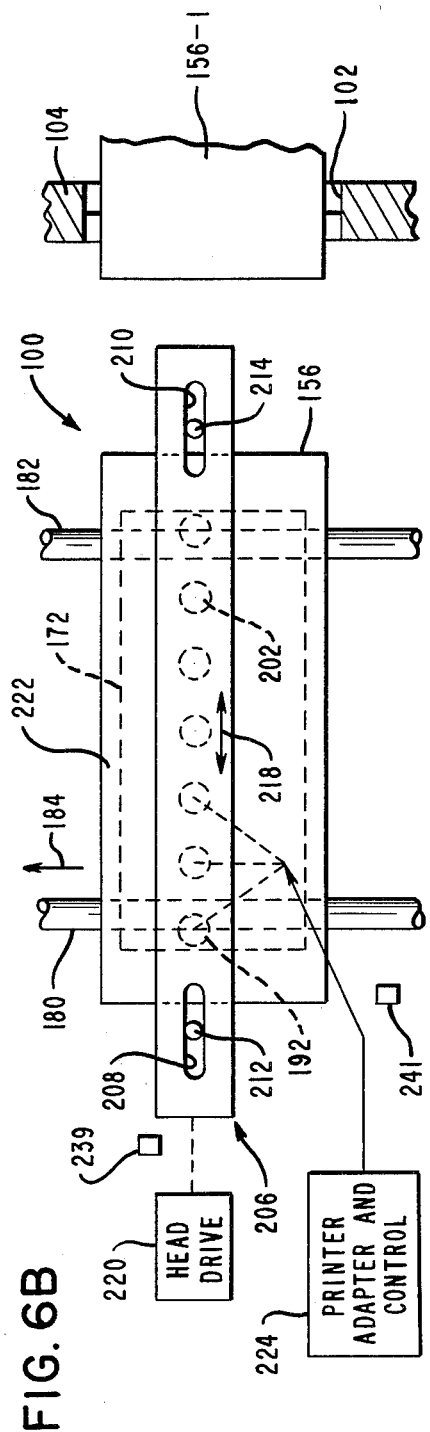
FIG. 6B is a plan view, in diagrammatic form, of the printing means shown in FIG. 5B.

From the supply roll 107 (FIG. 5A) the strip 110 of check forms passes around a roller 120 which is rotatably mounted within the frame (not shown) of the terminal 20. A drive roller 122 and its associated back-up or pinch roller 124 are used to index or move the strip 110 towards the station 36. A detector or sensor 126, such as a photoelectric cell, is located along the path of travel of the strip 110 to coact with a mark on the strip 110. The mark selected may be any convenient mark on the front or back of the strip 110, which mark is detected by the sensor 126 which is suitably located along the path of travel of the strip 110 so as to accurately position a check in the strip at station 36 in preparation for receiving a user's signature as previously described. A second drive roller 128 and its associated pinch roller 130, having the strip 110 sandwiched therebetween, are also used for transporting the strip. A conventional check drive #1 (also marked 132), shown only diagrammatically in FIG. 5A, is used to rotate or drive the drive rollers 122 and 128 under the control of the control means 242 shown in FIGS. 2A and 2B so as to position the signature line 134 (FIGS. 6A and 7) over the writing table 52. In the embodiment described, the opening 136 (FIG. 6A) at the station 36 is smaller than the size of the writing table 52 so as to prevent unauthorized access into the interior of the terminal at the opening 136. A writing instrument 138, secured to the terminal 20 with a flexible retaining cord, permits a user to sign his name upon the line 34. Generally, a ball point pen is preferable as a choice for instrument 138, as it enables a wide range of writing pressures to be exerted upon the writing table 52. A protective cover exists over the opening 136 to prevent unauthorized writing on the strip 110 and table 52 when the terminal is not in use. The protective cover may be a conventional sliding cover or a hinged cover 140 (FIG. 4) which pivots out of the way to expose the strip 110 at station 36 when a valid card is inserted at station 26 (FIG. 1) to activate the terminal 20.

After the terminal 20 analyzes the signature (by techniques to be later described herein) in order to determine whether or not the user is authorized, and assuming that the signature and the amount requested by the user are valid, then the strip 110 is moved to the right as viewed in FIG. 5A by check drives #1 and #2, and then the movement of the strip 110 is stopped. The sensor 126 is used to de-energize the check drives #1 and #2 so as to position the strip 110 so that a new check is positioned at the station 36, and the "signed check" is positioned with regard to a stationary knife 146. The strip 110 is cut by a moveable knife 142 which is moved by an actuator 144 against the stationary knife 146. Drive rollers 148, 150 (FIG. 5A), 168, and 170 (FIG. 5B) and their associated pinch rollers 152, 154, 188 and 190, respectively, are then used to transfer the cut check to the printing means 100 in FIG. 5B where the cut check is referenced as 156. The drive rollers 148, 150, 168 and 170 are driven by the check drive #2. Check drive #2 (also marked 166) and the actuator 144 are under the control of the control means 242 (FIGS. 2A and 2B) to be later described herein.

A pivotally mounted deflector 158 (FIG. 5A) is used to deflect selected checks severed from the strip 110 into a reject bin 160 located within the terminal 20. If a signature is not accepted or is not recognized by the terminal 20 as being valid, or if a valid user changes his mind about wanting the check after he has signed it, or if it is determined by the host bank that there are insufficient funds in the account being processed, for example, then the control means 242 within the terminal 20 will energize a conventional deflector actuator 162, pivoting the deflector 158 to the position shown by the dashed outline 158-1. In other words, instead of going to the printing means 100, such a severed check like 164 (shown in dashed outline) will be deflected into the internal reject bin 160.

Assuming, then, that an authorized user is requesting an authorized amount from his account and all the data necessary for printing is determined, the check drives #1 and #2 will be actuated and de-actuated as previously described and the strip 110 will be severed by knife 142 in FIG. 5A. The check drive #2 is then energized to rotate the drive rollers 148 and 150 to move the severed check towards the printing means 100 in FIG. 5B. The check drive #2 also rotates the drive rollers 168 and 170 to receive and finally position the check over the platen 172. A suitable detector or sensor 174, such as a photoelectric cell which senses the leading edge 176 of the check 156 (FIG. 5B), for example, may be used to de-energize the check drive #2 (166) so as to position the check 156 in printing relationship with the printing means 100.

The printing means 100 (FIGS. 5B and 6B) may be conventional. In the embodiment described, the printing means 100 includes a table or carriage 178 which is slidably mounted on stationary, spaced-apart rods 180 and 182 which are mounted within the terminal 20. The carriage 178 is slidably mounted on these rods 180 and 182 and it is incrementally moved in the direction of arrow 184 by a carriage drive 186. As is best shown in FIG. 5B, the platen 172 overlies and is secured to the carriage 178. Suitable pinch rollers 188 and 190 cooperate with their opposed drive rollers 168 and 176, respectively, to transport the check 156 (shown in exaggerated thickness) on to the platen 172 and to retain the check 156 on the platen 172 during the printing of the check.

The printing means 100 (FIGS. 5B and 6B) also includes a plurality of printing actuators such as 192, 194, 196, 198, 200, 202, and 204 which are fixedly mounted in a print head or support 206 in equally-spaced, aligned relationship therein so as to enable the associated printing elements 207 to print dots along a printing line on the check 156 when the associated actuators like 192 through 204 are energized. The paper from which check 156 is made may be of the "carbonless" type, or an ink ribbon (not shown) containing magnetic ink for MICR encoding may be used to effect the printing. The support 206 has spaced, elongated slots 208 and 210 therein which receive pins 212 and 214, respectively. The pins 212 and 214 are fixed to the frame 216 (diagrammatically shown) of the terminal 20, and the slots 208 and 210 are aligned to enable the support 206 and the printing actuators 192-204 to be moved or reciprocated in the opposing directions indicated by the arrows 218. A head drive 220, operatively coupled to the support 206, is used to diagrammatically index or move the support 206 (for on-the-fly printing) towards the right (as viewed in FIG. 6B) when printing along a printing line on the check 156 and to print along a new print line thereon when the carriage 178 is indexed one print line in the direction of arrow 184. Bi-directional printing can be effected by the printing means 100 shown, and printing can be effected quickly over the entire area of the check 156 by the proper selection of the number of printing actuators like 192 and 194 and the centerline distance between adjacent said printing actuators. In other words, the printing on a check 156 can be effected, for example, by starting near the top 222 of the check. The head drive 220 progressively moves the support 206 in one direction, to the right, for example, as viewed in FIG. 6B, for a total distance equal to the centerline-to-centerline distance between adjacent printing actuators like 192 and 194. A conventional printer adapter and control means 224 is used to control the energization of the actuators like 192-204 to effect the desired printing. After a line of printing is effected, the carriage 178 is indexed one printing line by the carriage drive 186 in the direction of arrow 184 (FIG. 6B) and printing is then effected by progressively moving the support 206 to the left (in the example being discussed). When the support 206 reaches its left-most position, the carriage drive 186 again indexes the carriage 178 one printing line in the direction of arrow 184 and the head drive 220 then moves the support 206 progressively to the right to repeat the printing process. By this technique, printing can be effected over substantially the entire area of the check 156. During the time that printing is effected, the check 156 is held stationary on the platen 172 by the drive rollers 168 and 170 and their associated pinch rollers 188 and 190, respectively; these rollers and their associated check drive #2 (166) may be mounted on the carriage 178 to travel therewith.

After total printing is effected on the check, the carriage 178 is moved in a direction which is opposite to that indicated by arrow 184 (FIG. 6B) to align the completed and printed check 156 with the discharge slot 102 through which the check 156 is dispensed. When the check 156 is so aligned, the check drive #2 (166) is again energized along with a check drive #3 (234) to rotate the drive wheels 168 and 170 to transfer the check to the drive wheels 226 and 228 and their associated pinch rollers 230 and 232, respectively. The drive wheels 226 and 228 are rotated or driven by the conventional check drive #3 (234); these drive wheels transport the check (shown as 156-1 in FIG. 6B) partially out of the dispensing slot 102 where it momentarily is retained until it is picked up by the user of the machine.

Some additional sensors are associated with the check transport means 98 and the printing means 100. An exit sensor 236 (FIG. 5B) is located near the exit slot 102 in the side panel 104 to produce a "Check Present" signal when a check like 156-1 is present thereat, and thereafter, when the check 156-1 is removed, a "Check Removed" signal is produced. When a check like 164 in FIG. 5A is deflected into the reject bin 160, it produces a signal on reject sensor 238 which conventionally detects the check as it falls into the reject bin 160. A conventional supply sensor 240 (FIG. 5A) cooperates with the supply roll 107 to give an indication when the supply of check forms is low. A print head position sensor 239 (FIG. 6B) is positioned to conventionally produce a signal when the print head or support 206 is moved to the extreme left (as viewed in FIG. 6B) by the head drive 220, thereby indicating a reference or home position. A carriage position sensor 241 (FIG. 6B) which coacts with carriage 178 is used to indicate when the carriage 178 is in a home position where it is aligned with the slot 102. A card sensor 237 (FIG. 2B) is associated with the card reader 32 so as to give an indication of the presence of a credit card therein. The sensor 237 may be used to initiate the start of a reading operation when the reader 32 itself moves the card, and it may also be used to indicate (to the user) the presence of his card in the terminal 20 and to indicate the need for removal therefrom upon completion of the use of the terminal 20.

Figure 2A:
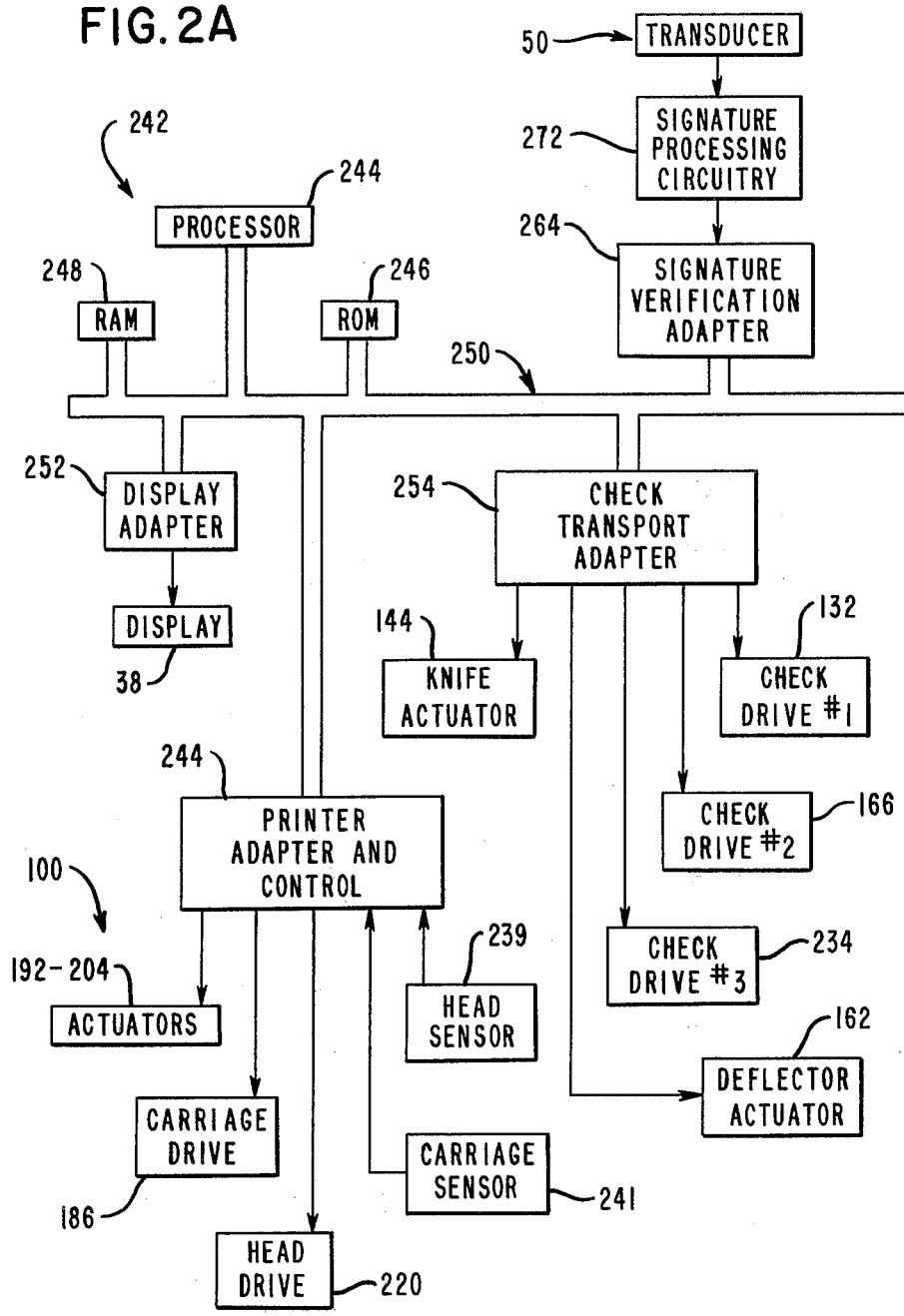

The control means 242 alluded to earlier herein for the terminal 20 is shown in FIGS. 2A and 2B. The control means 242 includes a central processing unit or processor 244, a read only memory (ROM) 246, a random access memory (RAM) 248, and a conventional tri-state bus 250 which are interconnected as is conventionally done. The necessary programs for controlling the operations of the terminal 20 are stored in the ROM 246, and the RAM 248 is used for conventionally handling temporary storage.

The control means 242 (FIGS. 2A and 2B) also includes conventional adapters such as the display adapter 252, the printer adapter and control 224, the check transport adapter 254, the sensors adapter 256, the communications adapter 258, the keyboard adapter 260, the reader adapter 262, and the signature verification adapter 264 which are coupled to the bus 250 to enable the elements associated with these adapters to communicate with the processor 244 and to be controlled thereby. It appears appropriate to discuss the functioning of the control means 242 as it relates to a typical operation performed thereat.

The first step to initiate action at the terminal 20 is for a user of the terminal to insert his authorization or identification card into the reading station 26 (FIG. 1). When the card is inserted in the terminal 20 at station 26, the sensor 237 (FIG. 2B) will initiate the reading of the card by the card reader 32. If a first reading is unsatisfactory, the user will be instructed via the display 38 to again pass the card in reading relationship with the reader 32 for manually operated units, and for automatically operated units, the associated card transport mechanism (not shown) will again move the card in the reader 32 to be read again. In the example being described, the data which is read from the card is, for example, the user's account number and a bank number for the particular bank at which the account resides. The data from the reader 32 is handled by the reader adapter 262 and is routed via the bus 250 to the communication adapter 258. The terminal 20 also includes a conventional Automatic Dialing and Modem circuit 266 (FIG. 2B) which is used to initiate the appropriate numbers for accessing the associated bank data system 268 via the telephone lines 270. Integrated circuit chips such as S2562 and S2859, for example, which are manufactured by American Microsystems, Inc. are typical chips which can be used for the dialing functions mentioned. The circuit 266 also contains a modulator-demodulator unit (MODEM) which translates the data or binary signal levels into the appropriate modulated signals for transferring the data over the telephone lines 270. In the embodiment described, data is tranferred over the lines 270 at a rate of about 300 bits per second; however, if necessary or desirable, the more expensive modems and communication lines for transferring data at rates of up to about 10,000 bits per second may be used. The signature verification data coming from the bank data system 268 for the user's account generally comprises a few thousands of bits in the embodiment described; consequently, it takes only about a few seconds to transfer this data via the circuit 266, the communications adapter 258, and bus 250 to the RAM 248 associated with the processor 244.

The next step in the process of using the terminal 20 is initiated via the application or operating program in the ROM 246 which requests the user (via the display 38) to sign his name at the signature line 134 on the blank check which is positioned at the write station 36 as previously explained. The hinged cover 140 (FIG. 4) is then moved to expose the check and writing table 52 to enable the user to write his signature thereon.

As the user records his signature at the writing station 36, the associated waveform like 96 in FIG. 8 is generated by the transducer 50 (FIGS. 2A and 4). The output of the transducer 50 is fed into the signature processing circuitry 272 (FIG. 2A) which will be described in more detail hereinafter. For the moment, it is sufficient to state that the circuitry 272 treats the waveform 96 so as to get it into a reduced, digital form or format so that it can be compared with the authorized or corresponding signature verification data stored in RAM 248 and received from the bank data system 268. The ROM 246 has the necessary algorithms for conventionally treating the data coming from the signature processing circuitry 272 (via the adapter 264) and for placing it in a format which facilitates comparing it with the signature verification data stored in the RAM 248.

If the comparison of stored signature verification data with that just received from the transducer 50 indicates a valid signature, then the processor 244 (via the application program stored in ROM 246) will request the user (via the display 38) to enter the monetary amount of the check desired on the keyboard 34. Thereafter, the payee code (obtained by the user from a conveniently-displayed list, for example) is entered on the keyboard 34. An example of the payee code is shown in Table #1.

TABLE #1

| Payee Code | Payee Name |
|---|---|
| 01 | Department Store A |
| 02 | Department Store B |
| 11 | Grocery Store A |
| 12 | Grocery Store B |

After the user enters the payee code, the associated payee name will be obtained from the ROM 246 and later printed on the check by the printing means 100, as previously described.

If the user's signature is determined to be not valid, he is given a predetermined number (usually two) of extra opportunities to provide an authorized signature. To accomplish a second try, for example, the check transport means 98 (FIG. 5A) moves the check strip 110 to the right as viewed in FIG. 5A and then cuts off (via knife 142) the check with the unaccepted or unauthorized signature thereon. This action positions a new blank check at station 36 to enable the user to repeat the process of signature verification. If after a third try (for example), in obtaining a valid signature, the comparison indicates an invalid signature, then the control means 242 will indicate to the user (via the display 38) that no check will be issued to the user. The control means 242 will also release the user's card from the reader 32. As an alternative embodiment, the reader 32 may be used to transport the unsuccessful user's card into a card capture bin (not shown) located within the terminal 20.

Assuming that a valid signature has been received from the transducer 50 and that the monetary amount and the payee code have been entered upon the keyboard 34, the application program stored in the ROM 246 (FIG. 2A) will then transfer the monetary amount over the bus 250, adapter 258, and modem circuit 266 to the bank data system 268. If the evaluation criteria such as the cash balance in the account under question are satisfactory for the monetary amount requested, an issue signal will be initiated from the bank data system 268 and sent back to the processor 244 which will initiate the printing operation already discussed. As an alternative, at the time that the valid signature data is first forwarded to the RAM 248 to begin the signature verification procedure, the evaluation criteria such as the cash balance for that account number could also be transferred from the bank data system 268 to the RAM 248 associated with the processor 244. When the monetary amount requested via the keyboard 34 is obtained, it can be compared with the cash balance, for example, to obtain the authorization for issuing a check as previously described. It is apparent that other sequential combinations of the described events are also possible, for example, the amount of the check could be requested and confirmed as satisfactory, and then the signature could be requested and then verified.

After a check authorization signal is received, the application program stored in the ROM 246 will initiate the printing of the check.

The check authorization signal is used to energize the check drives #1 and #2 via the check transport adapter 254, causing the strip 110 to be moved to the right, as viewed in FIG. 5A. The signature station sensor 126 provides a signal (via the sensors adapter 256 in FIG. 2B) to de-energize the check drives #1 and #2 so as to position the strip 110 at the station 36 for a new user. As previously stated, the application program in ROM 246 controls the operation of the terminal 20 causing a cut signal to be issued to the knife actuator 144 to sever the signed check from the strip 110. Thereafter, the check drive #2 is actuated to move the now-severed check to the printing means 100. The print station sensor 174 (FIG. 5B) issues a signal via the sensors adapter 256 to de-energize the check drive #2 so as to position the check numbered 156 in FIG. 5B in printing relationship with the printing means 100 which is controlled by the printer adapter and control means 224.

The printer adapter and control means 224 (FIG. 2A) is conventional and controls the carriage drive 186, head drive 220, head sensor 239, carriage sensor 241 and actuators 192-204 to print the data on the check 156 as previously described. Essentially, the bank number data, account number, payee, and monetary amount are printed on the check 156.

After the printing of the check 156 is completed, the check drives #2 and #3 are actuated to move the completed check 156-1 partially out of the slot 102 to enable the user to grasp it. The exit sensor 236 produces the check present signal when check 156-1 is present at the slot 102 and the signal is fed through the sensors adapter 256 to the processor 244 which initiates an instruction on the display 38 informing the user of this fact. After the check 156-1 is removed, a change in the output of exit sensor 236 produces the check removed signal which is used to initiate a conventional end-of-operations procedure to terminate the operation of the terminal 20, including the energization of a conventional actuator (not shown) which moves the hinged cover 140 (FIG. 4) to protect the writing table 52 and a new blank check form thereon. Moving the hinged cover 140 as described could also be effected at the end of the signature entry procedure.

Figure 9:
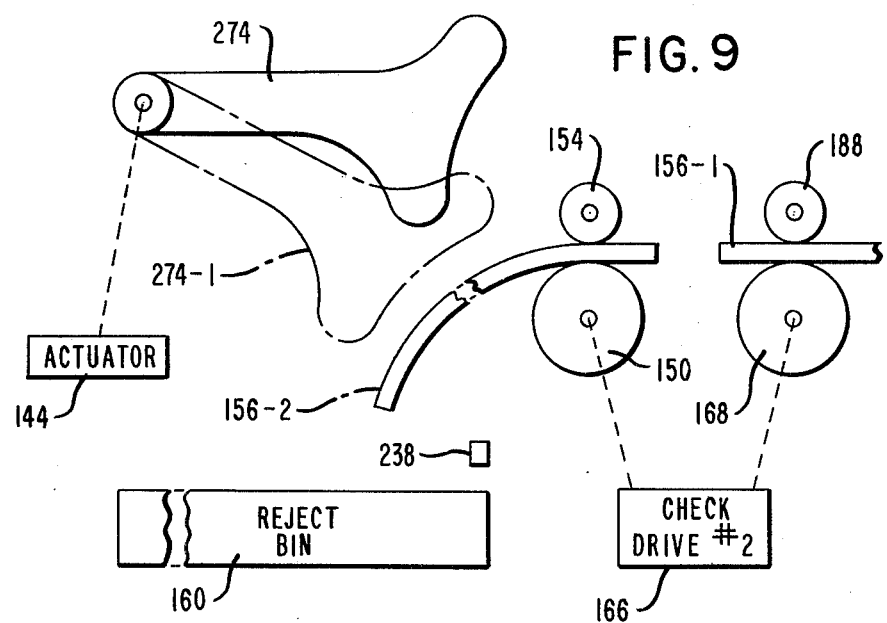
FIG. 9 is a side view, in diagrammatic form, of a modified embodiment of the deflector shown in FIG. 5A.

As an optional feature, if the user does not remove the completed check 156-1 from the slot 102 within a predetermined time, the check present signal from the exit sensor 236 and a timer (not shown) associated with the processor 244 may be used to initiate a reject signal. This reject signal is fed through the check transport adapter 254 to the check drives #2 and #3 to energize them in a reverse direction (from that previously described) causing the check 156-1 to be withdrawn into the terminal 20. A modified deflector 274 (FIG. 9) is used to deflect checks like 156-1 coming from the drive wheel 168 into the reject bin 160. When the deflector 274 is moved by the actuator 144 to the position shown by the reference numeral 274-1, it deflects the withdrawn check (now shown as 156-2) into the reject bin 160. Elements in FIG. 9 which are identical to elements already described are referenced with identical numbers and need not be explained further.

Figure 10:
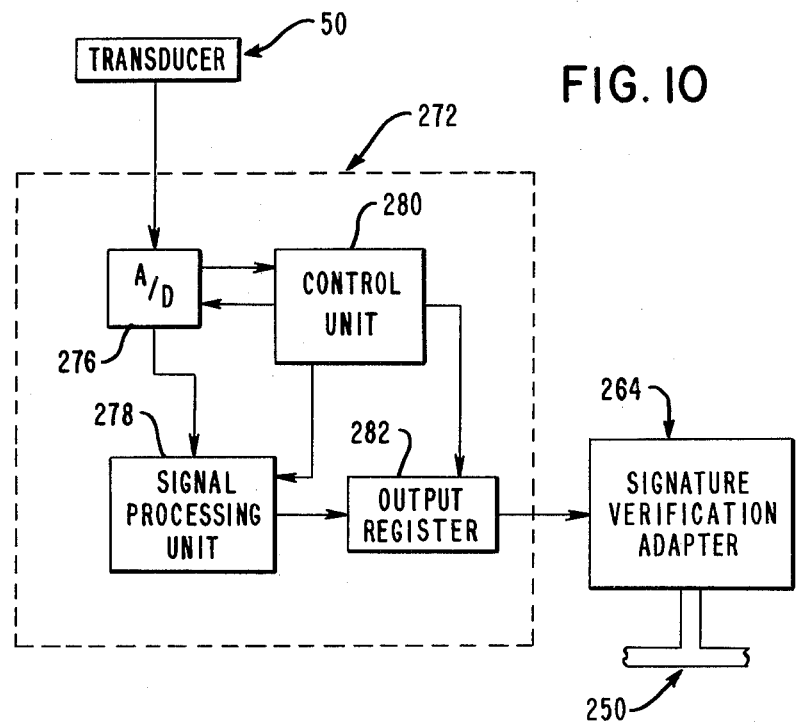
FIG. 10 is a general schematic diagram in block form showing one embodiment of the signature processing circuitry shown in FIGS. 2A and 2B.

The signature processing circuitry 272 (FIG. 2A) alluded to earlier herein is shown in more detail in FIG. 10. Because signature processing circuitry in general is well known, and because the details of such circuitry do not form a part of this invention, any such conventional circuitry may be used. For example, U.S. Pat. No. 3,618,019 discloses circuitry which provides for signature verification by means of pressure patterns. Accordingly, the circuitry 272 will be described only generally herein. Another signature verification means may be found in co-pending application U.S. Ser. No. 021,851 which was filled on Mar. 19, 1979 and was assigned to the same assignee as the assignee of this application.

The signature processing circuitry 272 is shown within the dashed outline in FIG. 10, and includes an A/D converter 276, a signal processing unit 278, a control unit 280, and an output register 282. The A/D converter 276 receives the analog pressure variations (as seen in the waveform 96 shown in FIG. 8) resulting from a user signing his name and converts these variations into digital signals which are processed by the signal processing unit 278.

The signal processing unit 278 (FIG. 10) utilizes a number of different parameters in arriving at an output which distinguishes one particular user's signature from another. For example, the number of peaks in a waveform (like 96), the distance between peaks, the number of times a user lifts the pen during signing, and the time for signing are a few of such parameters. Upon the completion of processing by the unit 278, a unique binary coded combination of signals or binary bits (which will be referred to hereinafter as a signature vector) for the signer is forwarded to the output register 282 where it is stored temporarily. Upon a request by the processor 244 (FIG. 2A), the signature vector from the output register 282 is transferred via the signature verification adapter 264 and bus 250 to the RAM 248 where it is used in comparing this particular signature vector with that received from the bank data system 268 for the associated account number. The signature vector can vary in length, for example, from a few bytes which are 8 bits long to a length which is over 100 such bytes of data. Generally, the more sophisticated systems which provide a higher degree of verification require the higher number of bytes to define the signature vector. The signature verification adapter 264 has the necessary firmware such as a ROM (not shown) associated therewith to handle the formatting and transferrence of the bytes of data over the bus 250. The control unit 280 (FIG. 10) provides all the necessary control pulses in the proper sequence to effect the control of the signature processing circuit 272.

In general, when a customer intends to use the services of the terminal 20, it is necessary, first, that he supply his bank with a predetermined number of signatures (such as five signatures, for example) so as to establish his "signature vector" which will be used as a basis of comparison with the signature rector derived at the terminal 20. The data representing the five signatures in the example given may be treated statistically so as to arrive at an "average" signature vector and also to arrive at an "error value" which is analogous to a statistical standard deviation. This error value can be used to set a threshold value which can be adjustably set tightly or loosely. When the threshold value is set tightly, it means that almost all the signatures subjected to verification are rejected. When the threshold value is set loosely, it means that almost all the signatures subjected to verification are accepted. For a practical system, it is necessary that the threshold limits be set so as to accept an authorized individual's signature and reject all other unauthorized or fraudulent signatures.

FIG. 11 is a flow chart showing the comparison process for producing an accept or a reject signal as earlier discussed herein. In this regard, the standard signature or signature vector for the account number from the bank data system 268 is compared (as shown by block 284) with the signature vector from the signature processing circuitry 272 to produce the accept or reject signals shown. The ROM 246 in FIG. 2A has the appropriate, conventional process steps stored therein to effect the compare operation shown by block 284. In some situations, the ROM 246 may also include some process steps for treating the standard signature vector and the signature vector prior to the compare operation shown in block 284. Because this aspect may be conventional, it is not described in any further detail.

We claim:

1. A check dispensing terminal comprising:
    a write station;
    means within said terminal for supplying a check form to said write station to enable a user to write the user's signature on said check form;
    means for converting the user's signing of said signature into identifying data unique to said user;
    means for comparing said identifying data with authorized data for said user to generate an accept signal when the comparison is favorable; and
    means for dispensing said check form bearing said user's signature from the terminal in response to a favorable comparison.

2. A method of issuing a check from a terminal comprising the steps:

(a) identifying the account number against which a monetary amount of a check to be issued by the terminal is to be charged;

(b) requiring that the user write his signature on a check form which is supplied by said terminal;

(c) using the user's act of writing his signature on said check form to ascertain whether or not said user is authorized to use said account number;

(d) verifying that said user has satisfied certain evaluation criteria associated with said account number for said monetary amount for which a check is to be issued;

(e) printing check data including at least said monetary amount on said check form with said signature thereon upon ascertaining that said user is authorized to use said account number and also that said user has satisfied said certain evaluation criteria associated; and (f) dispensing from said terminal said check form with said signature thereon and with said check data printed thereon, which last-named check form becomes said check which is issued from said terminal.

3. The method as claimed in claim 2 in which said step (e) is effected by:
(e-1) printing at least said account number and said monetary amount in a magnetic ink character recognition font.

4. A check issuing terminal comprising:
first means for identifying an account number against which a monetary amount of a check to be issued by said terminal is to be charged;
second means for inputting into said terminal identification data which will be used in determining whether to accept or reject a user of said terminal as authorized to issue a check against said account number;
third means for supplying authorized identification data to said terminal and also for supplying evaluation criteria for said account number;
entry means for entering check data including at least said monetary amount;
means for comparing said identification data with said authorized identification data and for generating an accept signal or a reject signal as a result of said comparing; said comparing means also comparing said monetary amount with said evaluation criteria and for generating an issue signal when the associated comparison is favorable;
means for transporting a record medium to a print station in said terminal, and
means for printing said check data including at least said monetary amount on said record medium at said print station in response to said accept signal and said issue signal, whereby said record medium becomes said check which is issued from said terminal.

5. The check issuing terminal as claimed in claim 4 in which said second means includes means for converting a handwriting sample by said user into said identification data.

6. The check issuing terminal as claimed in claim 5 in which said second means further comprises a write station and also in which said transporting means moves said record medium to said write station where said user writes his signature upon said record medium, said record medium with said signature thereon becoming said check which is issued from said terminal in response to said accept and issue signals.

7. The check issuing terminal as claimed in claim 6 in which said comparing means issues a no-issue signal when said monetary amount is unfavorable with respect to said evaluation criteria, and in which said transporting means also includes a reject bin into which a record medium with a said signature thereon is deposited when either a said reject signal or a said no-issue signal is generated by said comparing means.

8. The check issuing terminal as claimed in claim 7 in which said transporting means also includes means for supplying a strip of said record medium to said write station where it becomes said record medium with said signature thereon, and in which said transporting means also includes a means for cutting said record medium with said signature thereon from the rest of said strip of record medium.

9. The check issuing terminal as claimed in claim 8 in which said transporting means also includes a diverter which diverts a said record medium with a signature thereon into said reject bin in response to a said reject signal or a no-issue signal, and enables said transporting means to transfer said record medium with a signature thereon to said print station in response to said accept and issue signals.

10. The check issuing terminal as claimed in claim 9 in which said diverter is shaped to provide a bi-directional diverting function.

11. The check issuing terminal as claimed in claim 4 in which said printing means includes ink and a printing format to enable said account number and monetary amount to be printed in magnetic ink character recognition encoding.

12. The check issuing material as claimed in claim 6 in which said write station includes a table and transducer which convert the pressure variations with respect to time resulting from said user writing his signature upon said record medium into said identification data.

13. A check issuing terminal comprising:
means for identifying an account number against which a monetary amount of a check to be issued by said terminal is to be charged;
a write station;
means for supplying a check form to said write station to enable a user to sign the user's name on said check form which becomes a signed check form;
means for converting the user's act of signing the user's name on said check form into identifying data which is unique to said user;
means for entering check data including said monetary amount for the check to be issued;
means for comparing said identifying data with authorized data for said user to generate an accept signal when the comparison is favorable, and also for comparing said monetary amount with the monetary balance for said account number to generate an issue signal when the associated comparison is favorable; and
means for printing on said signed check form said check data including said monetary amount in response to said accept and issue signals so as to comprise said check which is dispensed from said terminal.

14. The check issuing terminal as claimed in claim 13 in which said write station includes a table and transducer which convert the pressure variations with respect to time resulting from said user writing his signature upon said check form into said identification data.

15. The check issuing terminal as claimed in claim 4 in which said printing means includes ink and a printing format to enable said account number and monetary amount to be printed in magnetic ink character recognition encoding.

16. A check dispensing terminal comprising:
means for reading an identification card for entering an account number into said terminal;
a signature table to enable a user of said terminal to sign his name on a check form located at said table;
means for supplying check forms to said signature table;
verifying means operatively connected to said signature table to identify a user of said terminal who signs his name on a said check form at said signature table as the rightful user of said account number;
keyboard means for entering check data such as monetary amount and payee for use in printing on said check form;
a display for displaying data and instructions associated with the use of said terminal;
means for printing said check data on said check form;
a data bank source;
processor means operatively connecting said reading means, verifying means, supplying means, keyboard means, display, and data bank source whereby said processor means will generate an issue signal when said verifying means indicates that said user is a rightful user of said account number and said user can rightfully issue a check for the monetary amount entered on said keyboard means, said issue signal being used by said printing means to print said check data on said check form with said signature thereon.

17. The check issuing terminal as claimed in claim 16 in which said terminal includes a housing with a slot therein through which said check form with said signature and check data thereon may extend to be grasped by said user, and further comprising means to withdraw said check form into said housing if it is not removed therefrom in a predetermined time.

18. The check issuing terminal as claimed in claim 17 in which said printing means includes ink and a printing format to enable at least said account number and monetary amount to be printed in magnetic ink character recognition encoding; said check form having markings thereon to identify it as being dispensed from said terminal.

* * * * *

UNITED STATES PATENT AND TRADEMARK OFFICE
CERTIFICATE OF CORRECTION

PATENT NO. : 4,385,285

DATED : May 24, 1983

INVENTOR(S) : William R. Horst et al.

It is certified that error appears in the above-identified patent and that said Letters Patent are hereby corrected as shown below:

Column 16, line 35 delete "material" and substitute --terminal--.

Signed and Sealed this

Eighteenth Day of December 1984

[SEAL]

Attest:

GERALD J. MOSSINGHOFF

*Attesting Officer*    *Commissioner of Patents and Trademarks*